United States Patent [19]
Yagi et al.

[11] Patent Number: 5,293,322
[45] Date of Patent: Mar. 8, 1994

[54] INDUSTRIAL ROBOT APPARATUS

[75] Inventors: Nobuo Yagi; Teruo Kurihara; Hisao Kato, all of Aichi, Japan

[73] Assignee: Mitsubishi Denki Kabushiki Kaisha, Tokyo, Japan

[21] Appl. No.: 867,082

[22] Filed: Apr. 14, 1992

Related U.S. Application Data

[63] Continuation of Ser. No. 582,036, Sep. 13, 1990, abandoned.

[30] Foreign Application Priority Data

Oct. 24, 1989 [JP] Japan ................... 1-276412

[51] Int. Cl.⁵ ............................................ G05B 13/00
[52] U.S. Cl. ........................................ 364/478; 318/639; 318/640; 364/184; 901/49
[58] Field of Search ............... 198/464.1; 901/7, 49; 318/563, 565, 566, 639, 640; 364/478, 184

[56] References Cited

U.S. PATENT DOCUMENTS

| | | | |
|---|---|---|---|
| Re. 30,016 | 5/1979 | Hohn | 901/7 X |
| 4,398,233 | 8/1983 | Bala et al. | 901/49 X |
| 4,418,398 | 11/1983 | Hornung | 364/900 |
| 4,631,464 | 12/1986 | Kato | 318/563 |
| 4,636,699 | 1/1987 | Kato | 901/49 X |
| 4,695,941 | 9/1987 | Kumar | 318/565 X |
| 4,697,876 | 9/1987 | Tenma et al. | 901/7 X |
| 4,706,001 | 11/1987 | Nakashima et al. | 901/49 X |
| 4,984,349 | 1/1991 | Ohta et al. | 901/49 X |

FOREIGN PATENT DOCUMENTS

| | | |
|---|---|---|
| 2513655 | 10/1976 | Fed. Rep. of Germany . |
| 3630904 | 4/1987 | Fed. Rep. of Germany . |
| 2558277 | 7/1985 | France . |
| 61-88301 | 5/1986 | Japan . |
| 2124941 | 2/1984 | United Kingdom . |

Primary Examiner—Michael S. Huppert
Assistant Examiner—Janice Krizek
Attorney, Agent, or Firm—Sughrue, Mion, Zinn, Macpeak & Seas

[57] ABSTRACT

An industrial robot apparatus comprise for controlling an industrial robot and a peripheral unit thereof according to a program so as to load workpieces on a pallet, an abnormal stop unit for detecting an abnormality which occurs in at least either of the industrial robot and the peripheral unit and for stopping both the industrial robot and the peripheral unit, a storage unit for storing a step of the program which is being executed when the abnormal stop takes place, and a removal unit for removing remaining workpieces to be loaded on the pallet in steps following the stored step of the storage unit.

5 Claims, 5 Drawing Sheets

INDUSTRIAL ROBOT APPARATUS

This is a continuation of application No. 07/582,036 filed Sep. 13, 1990, now abandoned.

BACKGROUND OF THE INVENTION

The present invention relates to countermeasures against an abnormal stop of an industrial robot apparatus for loading workpieces on a pallet.

An industrial robot apparatus with a fail safe means against an abnormal state such as an earthquake has been known as disclosed in Japanese Patent Laid Open Publication No. SHO 61-88301.

This industrial robot apparatus is structured so that an industrial robot is stopped when an abnormality occurs.

When the aforementioned conventional industrial robot apparatus for loading workpieces is abnormally stopped and then restarted, the program step in which the abnormality occurs is not always in accord with the actual operation stop situation. Thus, when the industrial robot apparatus is restarted, the workpieces are excessively or insufficiently loaded.

SUMMARY OF THE INVENTION

An object of the present invention is to solve such a problem and to provide an industrial robot apparatus where no loading failure takes place when it is restarted after an abnormal stop.

An industrial robot apparatus according to the present invention comprises a control unit for controlling an industrial robot and peripheral unit thereof by using a program so as to load workpieces on a pallet, abnormal stop means for detecting an abnormality which occurs in at least either of the industrial robot and the peripheral unit and for stopping both the industrial robot and the peripheral unit, storage means for storing a step of the program which is being executed when the abnormal stop takes place, and removal means for removing remaining workpieces to be loaded on a pallet in steps following the stored step of the storage means.

In accordance with the present invention, the industrial robot apparatus stores the program step in which the abnormal stop means operates, and removes remaining workpieces which are being loaded to a pallet in the step following the stored step by the removal means. Thus, after the industrial robot apparatus is restored from the abnormality and it is restarted, it is possible to prevent the workpieces from being improperly loaded to the pallet, thereby improving the reliability of the operations.

DETAILED DESCRIPTION OF THE PREFERRED EMBODIMENTS

Figure 1:
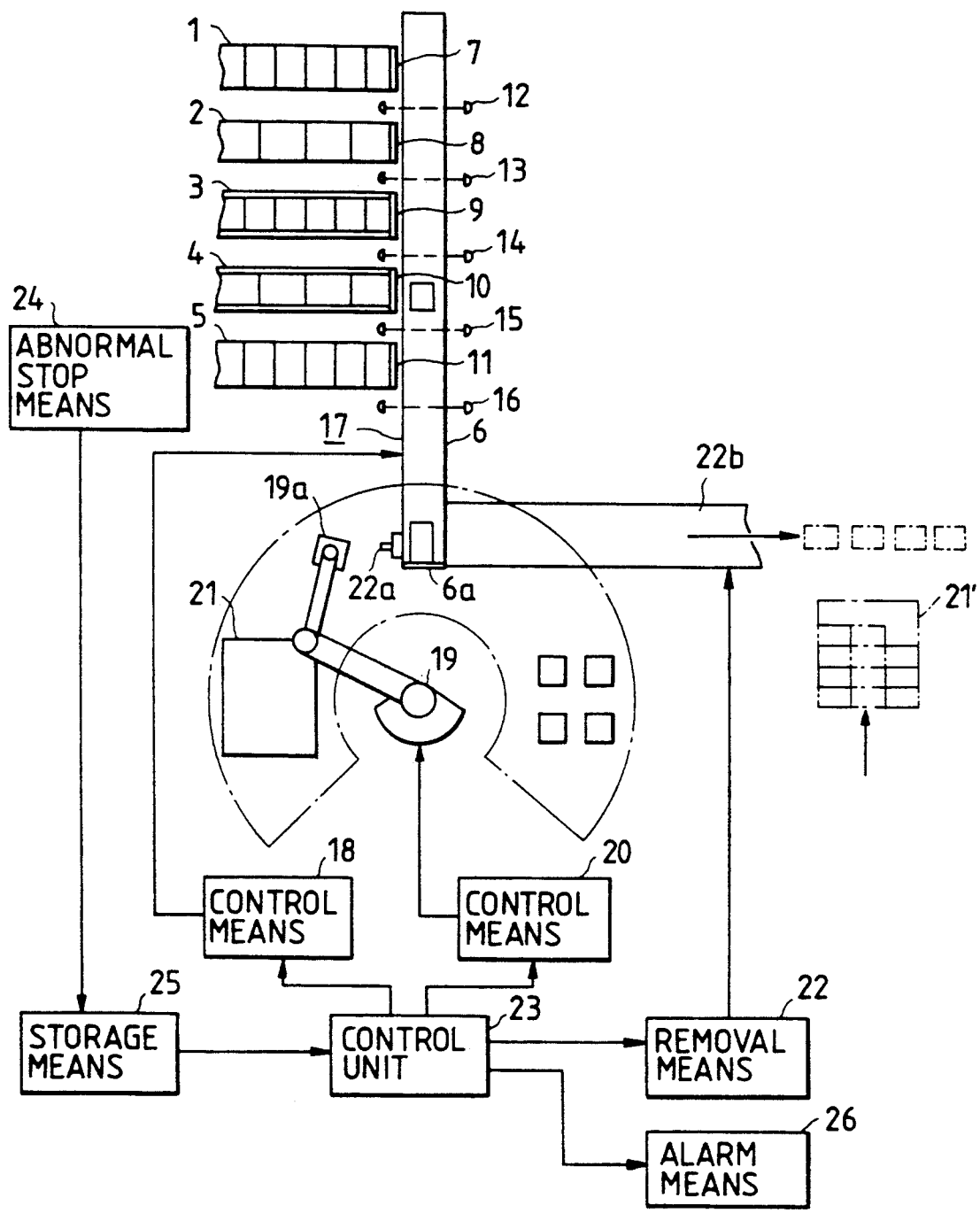
FIG. 1 is a conceptual plan view of an industrial robot apparatus in accordance with the present invention.
Figure 2:
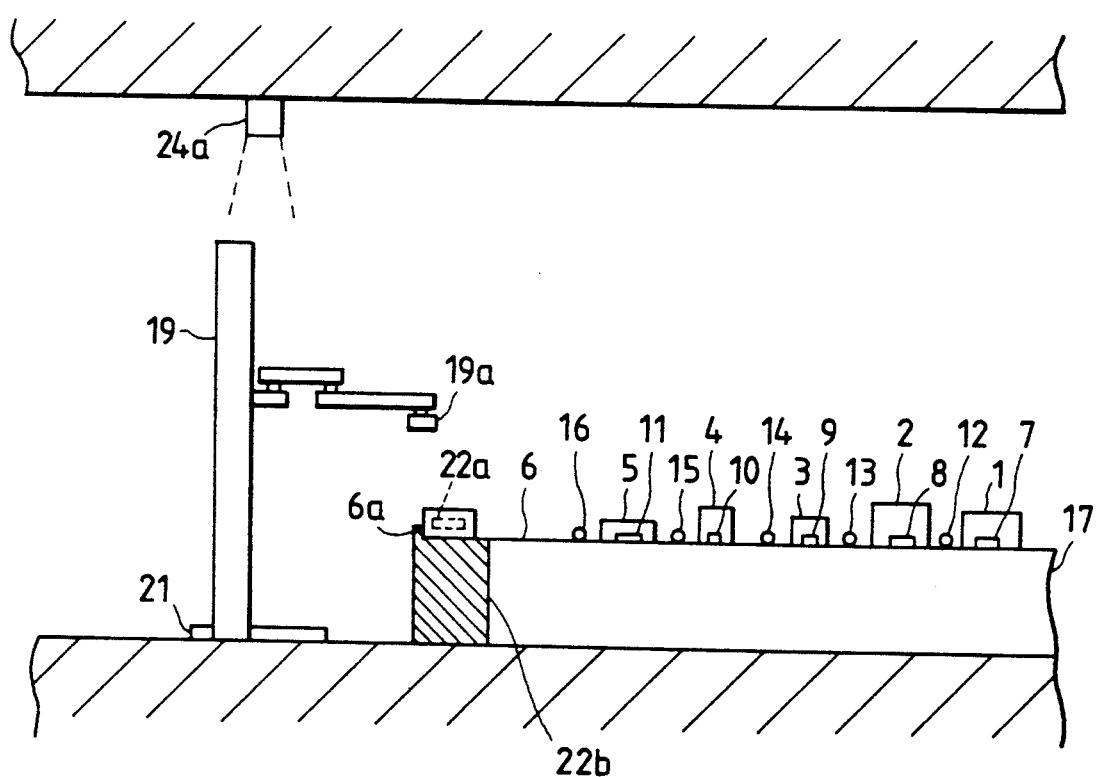
FIG. 2 is a right side view of FIG. 1.
Figure 3:
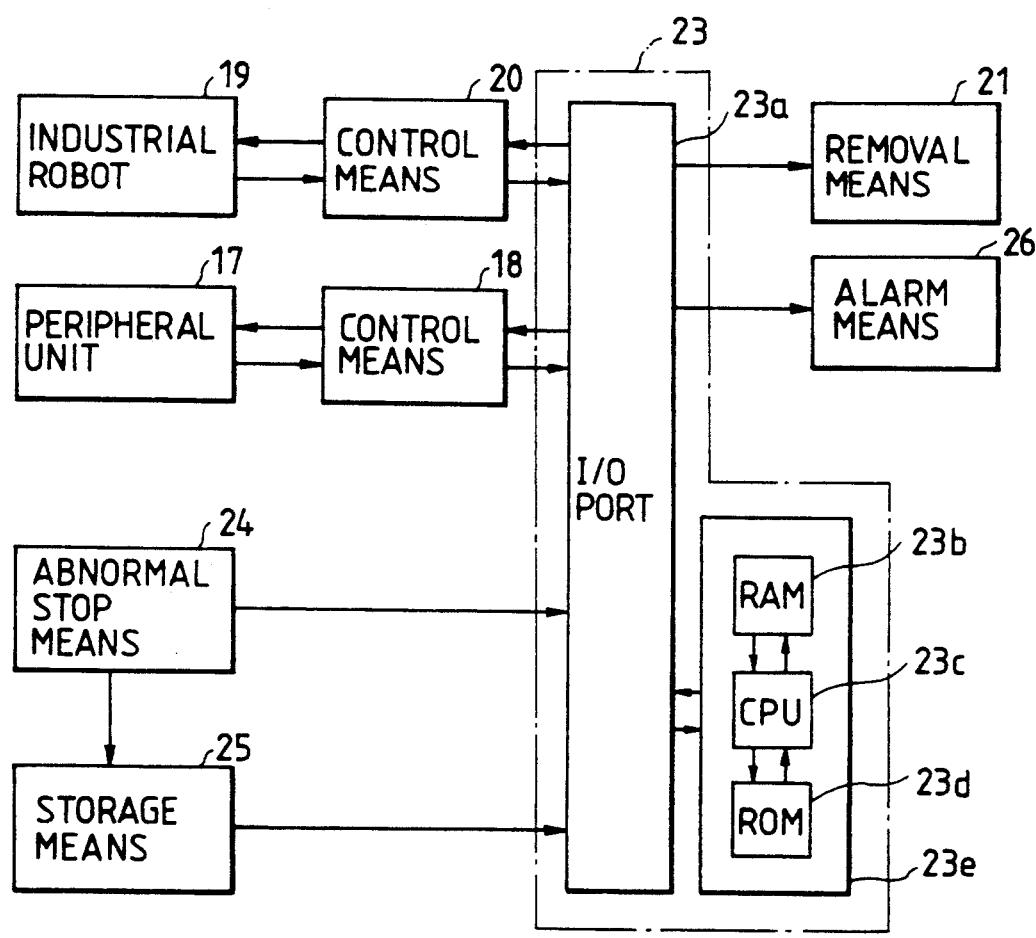
FIG. 3 is a conceptual electric diagram showing electric connections of the inventive industrial robot apparatus shown in FIG. 1.

FIGS. 1 to 4 are schematics showing an embodiment of the present invention. Reference numerals 1 to 5 designate receiving units, each of which is a conveyer for carrying particular workpieces different from others, respectively. The reference numeral 1 is a first receiving unit; 2 is a second receiving unit; 3 is a third receiving unit; 4 is a fourth receiving unit; and 5 is a fifth receiving unit, respectively. Reference numeral 6 is a supply conveyer disposed perpendicular to each end of the first receiving unit 1 to the fifth receiving unit 5, the supply conveyer 6 having a stopper 6a at one end.

Reference numerals 7 to 11 are blocking mechanisms disposed at one end of each of the first receiving unit 1 to the fifth receiving unit 5, respectively. Reference numerals 12 to 16 are counting units which are provided corresponding to the first receiving unit 1 to the fifth receiving unit 5, respectively, the optical path of each counting unit being traversed by the supply conveyer 6. Reference numeral 17 is a peripheral unit which is a supply unit comprising the supply conveyer 6, the blocking mechanisms 7 to 11, the counting units 12 to 16, and a control means 18. Reference numeral 19 is an industrial robot disposed at the end of the supply conveyer 6, the industrial robot 19 having a hand 19a.

Reference numeral 20 is a control means for the industrial robot 19. Reference numeral 21 is a pallet disposed at a particular position close to the industrial robot 19. Reference numeral 21' is a pallet on which workpieces are being loaded, the pallet being removed. Reference numeral 22 is a removal means including a removal program executed when an abnormal stop takes place, the removal means being provided with a removal extruding or extracting unit 22a and a removal conveyer 22b, which are disposed at the end of the supply conveyer 6. Reference numeral 23 is a control unit including a program for supplying workpieces and for loading them on a pallet, the control unit 23 being a computer comprising an I/0 port 23a, a RAM 23b, a CPU 23c, and a ROM 23d. Reference numeral 24 is an abnormal stop means for detecting abnormalities of the peripheral unit 17 and the industrial robot 19 and for executing abnormal stops for them. Reference numeral 24a is a vision sensor of the abnormal stop means 24, the vision sensor 24a downwardly monitoring the pallet 21 on which workpieces are being loaded. Reference numeral 25 is a storage means for storing a program step in which an abnormal stop takes place. Reference numeral 26 is an alarm means for informing the operator of the occurrence of the abnormal stop.

In the aforementioned industrial robot apparatus, the peripheral unit 17 and the industrial robot 19 are operated through the control unit 23 according to a load command. Workpieces whose type and quantity are commanded are supplied by the peripheral unit 17 and loaded on the pallet 21 by the industrial robot 19 in the programmed conditions. The pallet 21 where the workpieces have been loaded is sent to a shipment place or the like.

Figure 4:
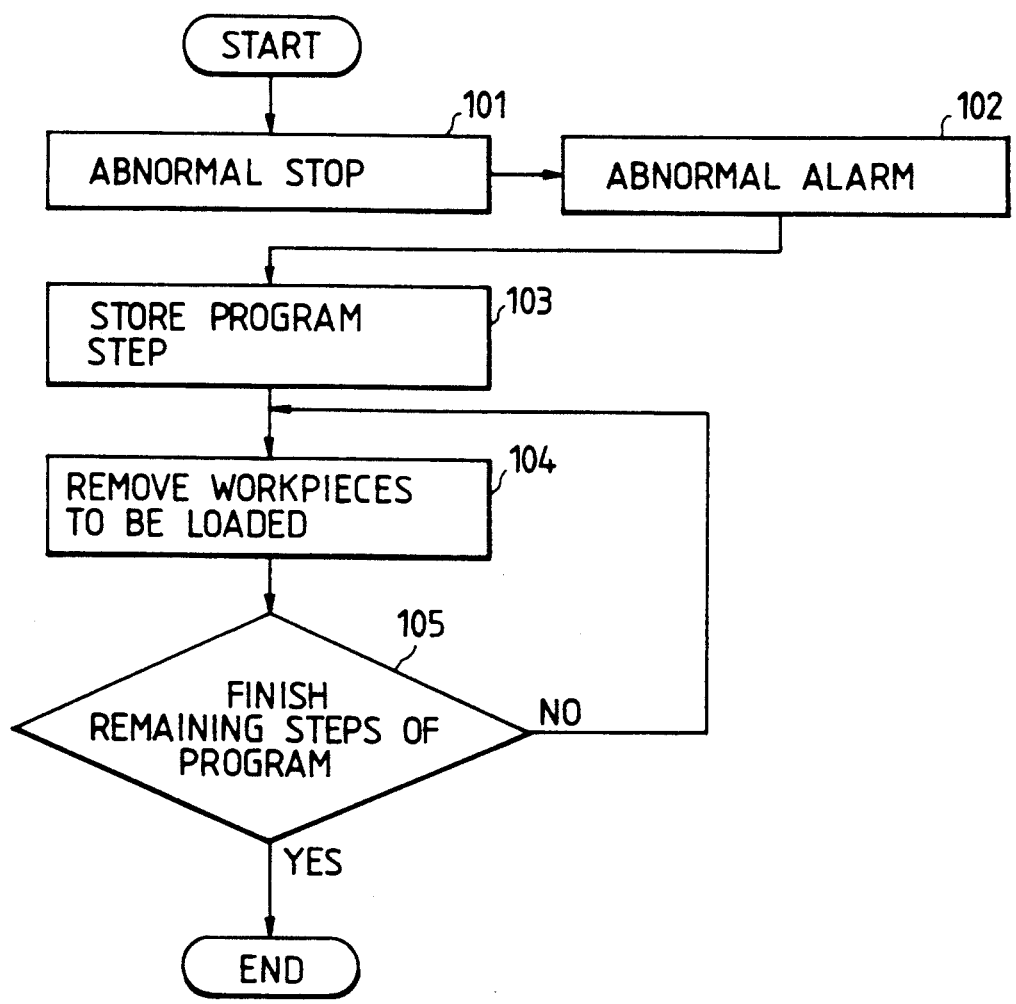
FIG. 4 is an outlined flow chart describing the operations of the inventive industrial robot apparatus shown in FIG. 1.

Referring to the flow chart of FIG. 4, a process in the case that the loading operation is stopped due to a power failure or that a workpiece drops from the hand 19a will be describe in the following.

When an abnormality takes place, the abnormal stop means 24 operates and thereby the peripheral unit 17 and the industrial robot 19 are abnormally stopped in the step 101. After that, the alarm means 26 is activated and an abnormal alarm is issued in the step 102. Subsequently, the storage means 25 stores the program step in which the abnormal stop takes place in the step 103. Then, the removal means 22 operates in the step 104. In the step 104, the remaining workpieces to be loaded in the steps following the stored step are removed by the operations of the peripheral unit 17, the removal extruding unit 22a and the removal conveyer 22b according to a command from the removal program. After that, in the step 105 the remaining workpiece removal operation in the step 104 is repeated until the remaining steps of the program which are executed after the abnormal stop takes place are completed. The removed workpieces and the pallet for which the loading operation has not yet been completed are transferred after the former have been manually loaded on the latter. Alternatively, the removed workpieces are sent to the corresponding receiving units 1 to 5, respectively. Thus, after the apparatus is restored from the abnormality and restarted, the required workpieces are completely loaded on the pallet, thereby providing an industrial robot apparatus with high reliability and high efficiency.

Figure 5:
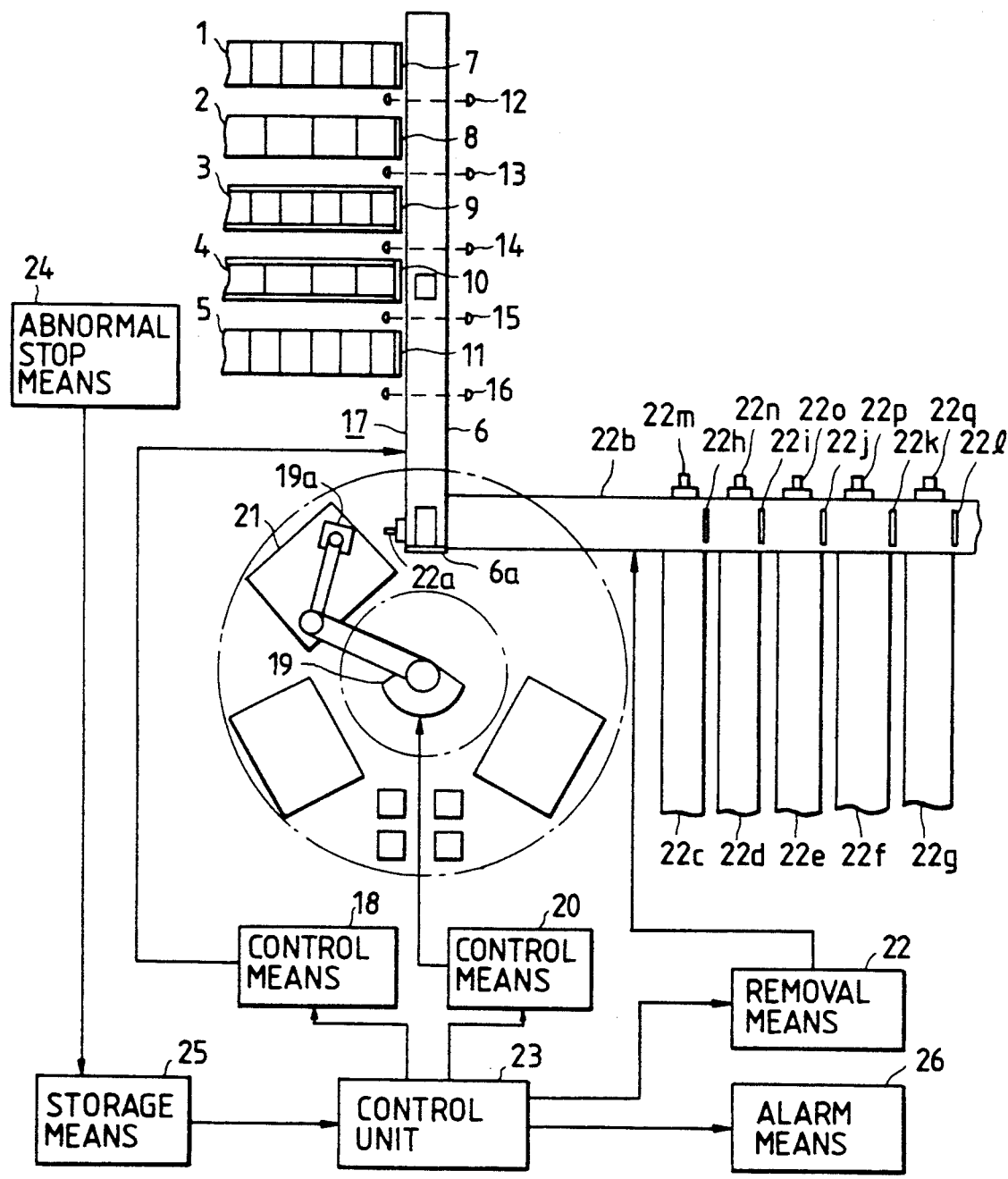
FIG. 5 is a schematic showing another embodiment of an industrial robot apparatus in accordance with the present invention, the schematic according with FIG. 1.

FIG. 5 is a schematic showing another embodiment of the present invention. In the figure, the same reference numerals as FIGS. 1 to 4 represent same portions, respectively. Reference numerals 22c to 22q are units structuring part of the removal means 22. The reference numeral 22c is a first section conveyer whose end is in contact with the removal conveyer 22b and which accords with the first receiving unit 1. The numeral 22d is a second section conveyer which is disposed like the first section conveyer 22c and which accords with the second receiving unit 2. The numeral 22e is a third section conveyer which is disposed like the first section conveyer 22c and which accords with the third receiving unit 3. The numeral 22f is a fourth section conveyer which is disposed like the first section conveyer 22c and which accords with the fourth receiving unit 4. The numeral 22g is a fifth section conveyer which is disposed like the first section conveyer 22c and which accords with the fifth receiving unit 5.

The numeral 22h is a first stopper which is disposed on the removal conveyer 22b and which accords with the first section conveyer 22c. The numeral 22i is a second stopper which is disposed on the removal conveyer 22b and which accords with the second section conveyer 22d. The numeral 22j is a third stopper which is disposed on the removal conveyer 22b and which accords with the third section conveyer 22e. The numeral 22k is a fourth stopper which is disposed on the removal conveyer 22b and which accords with the fourth section conveyer 22f. The numeral 22l is a fifth stopper which is disposed on the removal conveyer 22b and which accords with the fifth section conveyer 22g. The numeral 22m is a first extruding unit which is disposed on the removal conveyer 22b and which accords with the first section conveyer 22c. The numeral 22n is a second extruding unit which is disposed on the removal conveyer 22b and which accords with the second section conveyer 22d. The numeral 22o is a third extruding unit which is disposed on the removal conveyer 22b and which accords with the third section conveyer 22e. The numeral 22p is a fourth extruding unit which is disposed on the removal conveyer 22b and which accords with the fourth section conveyer 22f. The numeral 22q is a fifth extruding unit which is disposed on the removal conveyer 22b and which accords with the fifth section conveyer 22g.

In other words, in the embodiment shown in FIG. 5, the control unit 23, the abnormal stop means 24, the storage means 25, the removal means 22, and so forth are provided. Thus, it is obvious that the same operation as the first embodiment shown in FIGS. 1 to 4 can be accomplished in the second embodiment shown in FIG. 5.

Moreover, in the embodiment shown in FIG. 5, by the operations of the first stoppers 22h to the fifth stopper 22l and the first extruding unit 22m to the fifth extruding unit 22q, the workpieces which are removed when the abnormal stop takes place are sent to the first section conveyer 22c to the fifth section conveyer 22g. After that, the workpieces which are sent to the first section conveyer 22c to the fifth section conveyer 22g are returned to the first receiving unit 1 to the fifth receiving unit 5. Consequently, the labor required when an abnormal stop takes place can be saved.

What is claimed is:

1. An industrial robot apparatus for loading workpieces on a pallet and adapted for use with an industrial robot and a peripheral unit for supplying said workpieces to said industrial robot, said apparatus comprising:

control means for controlling said industrial robot and said peripheral unit associated with said industrial robot by using a program to load the workpieces on the pallet;

abnormal stop means for detecting an abnormality which occurs in at least one of said industrial robot and said peripheral unit and for stopping both said industrial robot and said peripheral unit;

storage means for storing a step of said program which is being executed when said abnormal stop occurs; and removal means for removing remaining workpieces from said peripheral unit which have not been loaded on said pallet in steps of the program following said step stored in said storage means, wherein said control means actuates said removal means to remove all of said remaining workpieces from said peripheral unit upon detection of said abnormality by said stop means.

2. An apparatus as claimed in claim 1, wherein said abnormal stop means includes a vision sensor means for monitoring said pallet on which the workpieces are being loaded.

3. An apparatus as claimed in claim 1, wherein said peripheral unit comprises a supply conveyor means for supplying said workpieces to said industrial robot, blocking means for stopping said workpieces on said supply conveyor means according to a command from said control means, and counting means for counting said workpieces to be supplied.

4. An industrial robot apparatus according to claim 1, wherein said removal means comprises means for stopping desired ones of said remaining workpieces being removed and selectively returning said desired workpieces to said peripheral unit.

5. An industrial robot apparatus according to claim 1, wherein said removal means further includes a removal program executed when an abnormal stop is detected.

* * * * *